(12) United States Patent
Oskam et al.

(10) Patent No.: US 7,141,920 B2
(45) Date of Patent: *Nov. 28, 2006

(54) GAS DISCHARGE LAMP WITH DOWNCONVERSION PHOSPHOR

(75) Inventors: Koert Oskam, Utrecht (NL); Andries Meijerink, Soesterberg (NL); Rene Theodorus Wegh, Eindhoven (NL); Claus Feldmann, Aachen (DE); Detlef Uwe Wiechert, Alsdorf (DE); Thomas Juestel, Aachen (DE); Cornelis Reinder Ronda, Aachen (DE)

(73) Assignee: Koninklijke Philips Electronics, N.V., Eindhoven (NL)

( * ) Notice: Subject to any disclaimer, the term of this patent is extended or adjusted under 35 U.S.C. 154(b) by 293 days.

This patent is subject to a terminal disclaimer.

(21) Appl. No.: 10/479,087

(22) PCT Filed: May 30, 2002

(86) PCT No.: PCT/IB02/01990

§ 371 (c)(1),
(2), (4) Date: Nov. 25, 2003

(87) PCT Pub. No.: WO02/097859

PCT Pub. Date: Dec. 5, 2002

(65) Prior Publication Data

US 2004/0155569 A1    Aug. 12, 2004

(30) Foreign Application Priority Data

May 30, 2001  (DE) ................. 101 26 159

(51) Int. Cl.
*H01J 1/62* (2006.01)
*H01J 61/44* (2006.01)

(52) U.S. Cl. ..................... 313/486; 313/483; 313/487; 252/301.4 R

(58) Field of Classification Search ............... 313/486; 252/301.4 R, 301.4 H
See application file for complete search history.

(56) References Cited

U.S. PATENT DOCUMENTS

| 5,714,835 | A * | 2/1998 | Zachau et al. ............... 313/486 |
| 5,770,111 | A * | 6/1998 | Moriyama et al. ..... 252/301.4 R |
| 6,251,304 | B1 * | 6/2001 | Wegh et al. ........... 252/301.4 R |
| 6,600,260 | B1 * | 7/2003 | Feldmann et al. .......... 313/486 |
| 6,692,660 | B1 * | 2/2004 | Kumar ................ 252/301.4 R |
| 6,822,385 | B1 * | 11/2004 | Oskam et al. .............. 313/486 |
| 6,917,153 | B1 * | 7/2005 | Oskam et al. .............. 313/483 |

FOREIGN PATENT DOCUMENTS

JP           84015951 B  *  4/1984

* cited by examiner

*Primary Examiner*—Sikha Roy

(57) ABSTRACT

A gas discharge lamp has a gas discharge vessel filled with a gas filling suitable for a gas discharge which emits VUV radiation, with a phosphor coating containing a downconversion phosphor. The downconversion phosphor has, in a host lattice, a pair of activators of a first lanthanoid ion and a second lanthanoid ion; a sensitizer selected from the group formed by the thallium(I) ion, lead(II) ion and bismuth(III) ion; and samarium(II) ion co-activator.

9 Claims, No Drawings

GAS DISCHARGE LAMP WITH DOWNCONVERSION PHOSPHOR

The invention relates to a gas discharge lamp fitted with a gas discharge vessel filled with a gas suitable for supporting a gas discharge emitting VUV radiation, with a phosphor coating containing a downconversion phosphor and with means for igniting and maintaining a gas discharge.

Conventional fluorescent lamps are mercury gas discharge lamps, the light emission of which is based on a mercury low-pressure gas discharge. A mercury low-pressure gas discharge emits radiation mainly in the near UV with a maximum at approximately 254 nm, which is converted into visible light by UV phosphors.

The mercury gas discharge lamp has a refined technology and, with regard to the lamp efficiency $\eta_{lamp}$, can only be matched or exceeded with difficulty by other lamp technologies.

The mercury in the gas filling is, however, increasingly regarded as an environmentally harmful and toxic substance which should be avoided as far as possible in modern mass production because of environmental risks in use, production and disposal. Therefore, for some time efforts have been concentrated on the development of alternative lamp technologies.

One of the mercury-free or low-mercury alternatives to the conventional mercury gas discharge lamp is the xenon low-pressure gas discharge lamp which has a gas filling containing mostly xenon. A gas discharge in a xenon low-pressure gas discharge lamp emits vacuum ultraviolet radiation (VUV radiation) in contrast to the UV radiation of the mercury discharge. The VUV radiation is generated by excimers, for example $Xe_2^*$, and is a molecular band radiation with a broad spectrum in the range about 172 nm. Using this lamp technology, discharge efficiencies $\eta_{dis}$ of 65% are already achieved.

Another advantage of the xenon low-pressure gas discharge lamp is the short response time of the gas discharge, which makes it useful as a signal lamp for automobiles, as a lamp for copier and fax devices and as a water disinfection lamp.

However, although the xenon low-pressure gas discharge lamp achieves a discharge efficiency $\eta_{dis}$ which is comparable to that of the mercury gas discharge lamp, the lamp efficiency $\eta_{lamp}$ of the xenon low-pressure gas discharge lamp is still clearly below that of the mercury gas discharge lamp.

In principle, the lamp efficiency $\eta_{lamp}$ consists of the components discharge efficiency $\eta_{dis}$, phosphor efficiency $\eta_{phos}$, the proportion of the generated visible light which leaves the lamp $\eta_{esc}$ and the proportion $\eta_{vuv}$ of UV radiation generated by the phosphor:

$$\eta_{lamp} = \eta_{dis} \cdot \eta_{phos} \cdot \eta_{esc} \cdot \eta_{vuv}$$

A handicap of the conventional xenon low-pressure gas discharge lamp lies in the conversion, which is ineffective in principle, of an energy-rich VUV photon with a wavelength of around 172 nm to a comparatively low-energy photon from the visible spectrum of 400 nm to 700 nm through the phosphor coating of the lamp. Even if the quantum efficiency of the phosphor is close to 100%, by conversion of a VUV photon to a visible photon, on average 65% of the energy is lost due to radiationless transitions.

Surprisingly, however, it has already been possible to develop VUV phosphors which achieve a quantum efficiency of more than 100% for the conversion of VUV photons to visible photons. This quantum efficiency is achieved in that a VUV quantum with an electron energy of 7.3 eV is converted to two visible quantums with an electron energy of approximately 2.5 eV. Such phosphors for xenon low-pressure gas discharge lamps are known from, for example, René T. Wegh, Harry Donker, Koentraad D. Oskam, Andries Meijerink "Visible Quantum Cutting in $LiGdF_4:Eu^{3+}$ through Downconversion" Science 283, 663.

In analogy to the multi-photon phosphors known for some time, which through "upconversion" generate one short-wave photon from two visible long-wave photons, these new phosphors, which generate two long-wave photons from one short-wave photon, are known as downconversion phosphors.

However, although the quantum efficiency of the known downconversion phosphors is high, this does not mean that also the phosphor efficiency $\eta_{phos}$ is high too. The phosphor efficiency $\eta_{phos}$ is not only determined by the quantum efficiency but also by the capability of the phosphor to absorb the VUV radiation to be converted. The absorptivity of the known downconversion phosphor, however, is very poor. Too much energy is lost due to undesirable absorptions in the lattice and hence the occupation of the excited states is reduced.

It is an object of the present invention to develop a gas discharge lamp fitted with a gas discharge vessel filled with a gas suitable for a gas discharge which emits VUV radiation, with a phosphor coating which contains a downconversion phosphor and with means for igniting and maintaining a gas discharge, the efficiency of which is improved.

In accordance with the invention, this object is achieved by a gas discharge lamp fitted with a gas discharge vessel filled with a gas filling suitable for supporting a gas discharge emitting VUV radiation, with a phosphor coating containing a downconversion phosphor, and with means for igniting and maintaining a gas discharge, in which the downconversion phosphor contains a pair of activators of a first lanthanoid ion and a second lanthanoid ion and a sensitizer, selected from the group formed by the thallium(I) ion, lead(II) ion and bismuth(III) ion.

Particularly advantageous effects in relation to the state of the art are obtained by the invention if the first lanthanoid ion is the gadolinium(III) ion and the second lanthanoid ion is selected from the holmium(III) ion and the europium(III) ion.

Within the scope of the present invention it is preferred that the downconversion phosphor comprises the gadolinium(III) ion as the first lanthanoid ion and, as the second lanthanoid ion, the holmium(III) ion and a co-activator selected from the group formed by the terbium(III)ion, ytterbium(III) ion, dysprosium(III) ion, europium(III) ion, samarium(III) ion and manganese(II) ion.

It may alternatively be preferred that the host lattice of the downconversion phosphor is a fluoride.

It is particularly preferred that the downconversion phosphor contains the first lanthanoid ion in a concentration of 10.0 to 99.98 mol %, the second lanthanoid ion in a concentration of 0.01 to 30.0 mol % and the sensitizer in a concentration of 0.01 to 30.0 mol %.

In accordance with an embodiment of the gas discharge lamp in accordance with the invention, the downconversion phosphor contains the sensitizer in a concentration of 0.5 mol %.

In accordance with another embodiment of the invention, the downconversion phosphor contains the co-activator in a concentration of 0.01 to 30.0 mol %.

In accordance with a further embodiment of the invention, the downconversion phosphor contains the co-activator in a concentration of 0.5 mol %.

The invention also relates to a downconversion phosphor which contains, in a host lattice, a pair of activators of a first lanthanoid ion and a second lanthanoid ion, and a sensitizer selected from the group formed by the thallium(I) ion, lead(II) ion and bismuth(III) ion. The phosphor is characterized by a high quantum efficiency, a high absorption of VUV photons and, in addition, a high chemical resistance, so that said phosphor is particularly suitable for commercial applications, also in plasma display screens. Such a phosphor can also advantageously be used for signal lamps in motor vehicles.

The invention is now described in more detail.

A gas discharge lamp according to the invention comprises a gas discharge vessel with a gas filling and with at least one wall having a surface that is at least partially transparent to visible radiation and that is provided with a phosphor layer. The phosphor layer contains a phosphor preparation with a downconversion phosphor of an inorganic crystalline host lattice which has obtained its luminous power from activation through an activator pair of a first and a second lanthanoid ion. The downconversion phosphor is sensitized by a sensitizer selected from the group formed by the thallium(I) ion, lead(II) ion and bismuth(III) ion. In addition, the gas discharge lamp is fitted with an electrode structure to ignite the gas discharge and with further means to ignite and maintain the gas discharge.

Preferably, the gas discharge lamp is a xenon low-pressure gas discharge lamp. Various types of xenon low-pressure gas discharge lamps are known which differ in the ignition of the gas discharge. The spectrum of the gas discharge first contains a high proportion of VUV radiation invisible to the human eye, which is converted into visible light in the coating of VUV phosphors on the inside of the gas discharge vessel and then emitted.

The term "vacuum ultraviolet radiation" below also refers to electromagnetic radiation with a maximum emission in a wavelength range between 145 and 185 nm.

In a typical construction for the gas discharge lamp, this consists of a cylindrical glass lamp bulb filled with xenon, on the wall of which on the outside is arranged a pair of strip-like electrodes which are electrically insulated from each other. The strip-like electrodes extend over the entire length of the lamp bulb, where their long sides lie opposite each other leaving two gaps. The electrodes are connected to the poles of a high voltage source operated with an alternating voltage of the order of 20 kHz to 500 kHz, such that an electric discharge forms only in the area of the inner surface of the lamp bulb.

When an alternating voltage is applied to the electrodes, in the xenon-containing filler gas a corona discharge can be ignited. As a result, in the xenon are formed excimers, i.e. molecules which consist of an excited xenon atom and a xenon atom in the basic state.

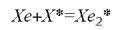

The excitation energy is emitted again as VUV radiation with a wavelength of $\lambda=170$ to 190 nm. This conversion from electron energy into UV radiation is highly efficient. The generated VUV photons are absorbed by the phosphors of the phosphor layer and the excitation energy is partly emitted again in the longer wavelength range of the spectrum.

In principle, for the discharge vessel a multiplicity of forms are possible, such as plates, single tubes, coaxial tubes, straight, U-shaped, circularly curved or coiled, cylindrical or other shape discharge tubes.

As a material for the discharge vessel quartz or glass types are used.

The electrodes consist of a metal, for example aluminum or silver, a metal alloy or a transparent conductive inorganic compound, for example ITO. They can be formed as a coating, an adhesive foil, a wire or a wire mesh.

The discharge vessel is filled with a gas mixture containing an inert gas such as xenon, krypton, neon or helium. Gas fillings which mainly consist of oxygen-free xenon having a low gas pressure, for example 2 Torr are preferred. The gas filling can also contain a small quantity of mercury in order to maintain a low gas pressure during discharge.

The inner wall of the gas discharge vessel is coated partly or fully with a phosphor coating which contains one or more phosphors or phosphor preparations. The phosphor layer can also contain organic or inorganic binding agents or a binding agent combination.

The phosphor coating is preferably applied to the inner wall of the gas discharge vessel as a substrate and can comprise a single phosphor layer or several phosphor layers, in particular double layers of a base and a cover layer.

A phosphor coating with a base and a cover layer allows the quantity of downconversion phosphor in the cover layer to be reduced and in the base layer a less costly phosphor to be used. The base layer preferably contains as a phosphor a calcium halophosphate phosphor selected so as to achieve the desired shade of the lamp.

The cover layer contains the downconversion phosphor which thus converts an essential part of the VUV radiation generated by the gas discharge directly into the desired radiation in the visible range.

An important characteristic of the downconversion phosphor in accordance with the invention resides in that it comprises a pair of activators of a first and a second lanthanoid ion and a sensitizer in a host lattice.

The first lanthanoid ion of the pair of activators preferably is the gadolinium(III) ion, the second lanthanoid ion of the pair of activators can be selected from the holmium(III) ion and the europium(III) ion.

The sensitizer is selected from the group formed by the thallium(I) ion, lead(II) ion and bismuth(III) ion. In general, these ions are also indicated in accordance with their electron configuration as $6s^2$ ions.

The sensitizer enhances the sensitivity of the downconversion phosphor to VUV radiation and makes it less wavelength-dependent. The sensitizer has a high intrinsic absorption in the desired VUV range of 100 to 200 nm, that exceeds the intrinsic absorption of the non-sensitized downconversion phosphors at approximately 183, 195 and 202 nm. The transmission of the excitation energy to the pair of activators is subject to losses because lattice imperfections cause excitation states traversing the lattice to release energy to said lattice in the form of heat oscillations. Next, the reduced, absorbed excitation energy is transferred to the activator and triggers the downconversion mechanism. This leads to increased luminescence of the downconversion phosphor as it has been "sensitized" by the sensitizer so as to be able to be luminescent upon exposure to VUV radiation.

The downconversion phosphor may additionally also comprise a co-activator. The co-activator is selected from the group of the trivalent ions of terbium, ytterbium, dysprosium, europium and samarium and the bivalent ions of manganese and samarium. The pair of activators of a first lanthanoid ion and a second lanthanoid ion and the co-activator ion cooperate in the sequential emission of photons by means of which the phosphor generates more than one visible photon from a VUV photon.

The excitation mechanism can take place by a $^8S\text{-}^6G$ excitation of the gadolinium(III) ion, after which a cross-relaxation transition between the Gd(III) ion and the holmium(III) ion or of the europium(III) ion takes place. Due to the cross-relaxation transition, the gadolinium(III) ion changes from the $^6G$ state to the $^6P$ state, the released energy causes the holmium(III) ion or the europium(III) ion to change from the $^5I_8$ state to the $^5F_5$ state. Next the holmium (III) ion or the europium(III) ion emits a visible photon, the energy of which corresponds to the transition from $^5F_5$ to $^5I_8$ or from $^5D_0$ to $^7F_1$.

After an energy transfer of the $^6P$-state of the gadolinium (III) ion to the co-activator, this also emits a visible photon.

The host lattice of the downconversion phosphor can consist of an inorganic material such as fluorides, oxides, halogenides, aluminates, gallates, phosphates, borates or silicates, doped with a few percent of both activators. The activators can be arranged on lattice sites or on interstitial lattice sites of the host lattice.

For the host lattice use is preferably made of fluorides, such as fluorides of the composition $M^1F$, where $M^1$=Li, Na, K, Rb, Cs or fluorides of the composition $M^2F_2$, where $M^2$=Mg, Ca, Sr, Ba or fluorides of the composition $M^3F_3$, where $M^3$=B, Al, In, Ga, Sc, Y, La and the lanthanoids. Particularly preferred is $GdF_3$ in which the first lanthanoid activator ion $Gd^{3+}$ is a constituent of the host lattice.

Furthermore, as host lattices are preferred ternary gadolinium-containing fluorides of the composition $M^1GdF_4$, $M^1{}_2GdF_5$, $M^1{}_3GdF_6$, $M^1Gd_2F_7$, $M^1Gd_3F_{10}$, $M^1{}_5Gd_9F_{32}$, where $M^1$=Li, Na, K, Rb, Cs or $M^2GdF_5$, $M^2{}_2GdF_7$, $M^2{}_3GdF_9$, $M^2Gd_2F_8$, $M^2Gd_3F_{11}$, $M^2Gd_4F_{14}$, $M^2{}_{13}Gd_6F_{43}$, where $M^2$=Mg, Ca, Sr, Ba, Mn, Zn in which gadolinium is also a constituent of the host lattice.

Also preferred as host lattices are fluorides of the composition $M^1M^3F_4$, $M^1{}_2M^3F_5$, $M^1{}_3M^3F_6$, $M^1M^3{}_2F_7$, $M^1M^3{}_3F_{10}$, $M^1{}_5M^3{}_9F_{32}$, where $M^1$=Li, Na, K, Rb, Cs, and where M3 =B, Al, In, Ga, Sc, Y, La and the lanthanoids; $M^2M^3F_5$, $M^2{}_2M^3F_7$, $M^2{}_3M^3F_9$, $M^2M^3{}_2F_6$, $M^2M^3{}_3F_{11}$, $M^2M^3{}_4F_{14}$, $M^2{}_{13}M^3{}_6F_{43}$, where $M^2$=Mg, Ca, Sr, Ba, Mn, Zn, and M3 =B, Al, In, Ga, Sc, Y, La and the lanthanoids; $M^3M^4F_7$, $M^3{}_2M^4F_{10}$, $M^3{}_3M^4F_{13}$, $M^3M^4{}_2F_{11}$, $M^3M^4{}_3F_{15}$, $M^3M^4{}_4F_{19}$, where $M^3$=B, Al, In, Ga, Sc, Y, La and the lanthanoids, and the lanthanoids, and $M^4$=Ti, Zr, Si, Ge, Sn, Pb.

Particularly preferred as host lattices are fluorides whose host lattice is based on the calcium fluorite crystal lattice type. In these lattices, the cations have an 8-fold coordination. Also particularly preferred are fluorides whose lattice is derived from the $YF_3$ crystal lattice type, in which the cations have a 9-fold co-ordination. Due to the high co-ordination figures and the non-polar ligands, these host lattices are characterized by a low ligand field for cations, which are part of the host lattice.

The phosphors doped with the activator pair preferably contain 10 to 99.8 mol % of the trivalent $Gd^{3+}$ and 0.01 to 30 mol%, particularly preferably 1.0 mol%, of the trivalent holmium or the trivalent europium.

The downconversion phosphor can readily be doped with the trivalent co-activators terbium, ytterbium, dysprosium, europium, samarium or manganese if, in the production of the phosphors, a fluoride selected from the group formed by $TbF_3$, $YbF_3$, $DyF_3$, $EuF_3$, $SmFe$ or $MnF_2$ is added to the starting compounds.

The absorption coefficient of the sensitized downconversion phosphors in accordance with the invention is particularly large for the wavelengths in the range of xenon radiation, and the quantum efficiency levels are high. The host lattice is not a factor in the luminescence process but influences the precise position of the energy levels of the activator ions and consequently the wavelengths of absorption and emission. The emission bands lie in the range from long UV to yellow-orange, but predominantly in the red and green range of the electromagnetic spectrum. The extinction temperature of these phosphors is above 100° C.

The grain size of the phosphor particles is not critical. Normally, the phosphors are used as fine grain powders with a grain-size distribution between 1 and 20 μm.

As production processes for a phosphor layer on a wall of the discharge vessel, both dry coating processes, for example electrostatic deposition or electrostatically supported sputtering, and wet coating processes, for example dip coating or spraying, can be considered.

For wet coating processes, the phosphor preparation must be dispersed in water, an organic solvent, where applicable together with a dispersion agent, a tenside and an anti-foaming agent or a binding agent preparation. Suitable binding agent preparations for a gas discharge lamp according to the invention are organic or inorganic binding agents which are capable of withstanding an operating temperature of 250° C. without destruction, embrittlement or discoloration.

For example, the phosphor preparation can be applied to a wall of the discharge vessel by means of a flow coating process. The coating suspensions for the flow coating process contain water or an organic compound such as butylacetate as the solvent. The suspension is stabilized and its rheological properties influenced by the addition of auxiliary agents such as stabilizers, liquefiers, cellulose derivatives. The phosphor suspension is applied to the vessel walls as a thin layer, dried and burnt in at 600° C.

It can also be preferred that the phosphor preparation for the phosphor layer is deposited electrostatically on the inside of the discharge vessel.

For a gas discharge lamp which is to emit white light, preferably a blue-emitting phosphor from the group $BaMgAl_{10}O_{17}:Eu^{2+}$ and $Sr_5(PO_4)_3Cl:Eu^{2+}$ is combined with a red-emitting phosphor from the group Rb $Gd_2F_7$:Eu,Tl; $KMgF_3$:Eu,Pb; $BaGd_2F_8$:Eu,Pb; $KGd_2F_7$:Eu,Bi and with a green-emitting phosphor from the group $(Y,Gd)BO_3$:Tb and $LaPO_4$:Ce,Th or with a green-red phosphor such as $LiGdF_4$: Ho,Tb,Tl.

The phosphor layer usually has a layer thickness of 5 to 100 μm.

The vessel is then evacuated to remove all gaseous contaminants, in particular oxygen. The vessel is then filled with xenon and sealed.

EXAMPLE 1

A cylindrical discharge vessel of glass having a length of 590 mm, a diameter of 24 mm and a wall thickness of 0.8 mm is filled with xenon at a pressure of 200 hPa. The discharge vessel contains an axis-parallel inner electrode in the form of a noble metal rod of 2.2 mm diameter. On the outside of the discharge vessel is the outer electrode composed of two strips of conductive silver 2 mm in width arranged axis-parallel and conductively connected to the power supply. The lamp is operated by means of a pulsed DC voltage.

The inner wall of the discharge vessel is coated with a phosphor layer.

The phosphor layer contains a three-band phosphor mixture with the following components: $BaMgAl_{10}O_{17}:Eu^{2+}$ as the blue component and $LiGdF_4:Ho,Tb,Tl$ as the green-red component.

To produce the $LiGdF_4:Ho,Tb,Tl$ with 1.0 mol % holmium and 0.5 mol % terbium and 2.0 mol % thallium, 29.55 g $GdF_3$, 3.83 g LiF, 0.31 g $HoF_3$, 0.15 g $TbF_3$ and 0.63 g $TlF_3$ are thoroughly mixed and ground in an agate mortar. The mixture is preburnt in a corundum crucible in a quartz tube under an argon atmosphere at a pressure of 8 hPa for 2 hours at 300° C. During burning, the quartz tube was rinsed with argon three times and evacuated again to 8 hPa. The oven temperature was then increased at a rate of 5.5° C./min to 650° C. and the mixture sintered for 8 hours at 650° C. The sintered powder was reground and sieved to a grain size <40 µm. The crystal structure of the formed phase was checked by means of X-ray diffractometry.

In this manner, a light output of initially 37 lm/W was achieved. After 1000 operating hours, the light output was approximately 34 lm/W. The quantum efficiency for VUV light is approximately 70%.

EXAMPLE 2

A cylindrical discharge vessel of glass having a length of 590 mm, a diameter of 24 mm and a wall thickness of 0.8 mm is filled with xenon at a pressure of 200 hPa. The discharge vessel contains an axis-parallel inner electrode in the form of a noble metal rod of 2.2 mm diameter. On the outside of the discharge vessel is the outer electrode composed of two strips of conductive silver 2 mm in width arranged axis-parallel and conductively connected to the power supply. The lamp is operated by means of a pulsed DC voltage.

The inner wall of the discharge vessel is coated with a phosphor layer.

The phosphor layer contains a three-band phosphor mixture with the following components: $BaMgAl_{10}O_{17}:Eu^{2+}$ as the blue component, $LaPO_4:Ce,Tb$ as the green component and $KGd_2F_7:Eu,Bi$ as the red component.

To produce $KGd_2F_7:Eu,Bi$ with 1.0 mol % europium and 5.0 mol % bismuth, a quantity of 29.70 g $GdF_3$, 0.29 g $EuF_3$, 4.27 g KF and 1.86 g $BiF_3$ are thoroughly mixed and ground in an agate mortar. The mixture is preburnt in a corundum crucible in a quartz tube under an argon atmosphere at a pressure of 8 hPa for 2 hours at 300° C. During burning, the quartz tube was rinsed with argon 3 times and evacuated again to 8 hPa. The oven temperature was then increased at a rate of 5.5° C./min to 650° C. and the mixture sintered for 8 hours at 650° C. The sintered powder was reground and sieved to a grain size <40 µm. The crystal structure of the formed phase was checked by means of X-ray diffractometry.

In this manner, a light output of initially 37 lm/W was achieved. After 1000 operating hours, the light output was approximately 34 lm/W. The quantum efficiency for VUV light is approximately 70%.

EXAMPLE 3

A cylindrical discharge vessel of glass having a length of 590 mm, a diameter of 24 mm and a wall thickness of 0.8 mm is filled with xenon at a pressure of 200 hPa. The discharge vessel contains an axis-parallel inner electrode in the form of a noble metal rod of 2.2 mm diameter. On the outside of the discharge vessel is the outer electrode that is composed of two strips of conductive silver 2 mm in width arranged axis-parallel and conductively connected to the power supply. The lamp is operated by means of a pulsed DC voltage.

The inner wall of the discharge vessel is coated with a phosphor layer.

The phosphor layer contains a three-band phosphor mixture with the following components: $BaMgAl_{10}O_{17}:Eu^{2+}$ as the blue component and $LaPO_4:Ce,Tb$ as the green component and $BaGd_2F_8:Eu,Pb$ as the red component.

To produce $BaGd_2F_8:Eu,Pb$ with 1.0 mol % europium and 1.0 mol % lead, a quantity of 29.70 g $GdF_3$, 0.29 g $EuF_3$, 12.88 g $BaF_2$ and 0.34 g $PbF_2$ are thoroughly mixed and ground in an agate mortar. The mixture is preburnt in a corundum crucible in a quartz tube under an argon atmosphere at a pressure of 8 hPa for 2 hours at 300° C. During burning, the quartz tube was rinsed with argon 3 times and evacuated again to 8 hPa. The oven temperature was then increased at a rate of 5.5° C./min to 650° C. and the mixture sintered for 8 hours at 650° C. The sintered powder was reground and sieved to a grain size <40 µm. The crystal structure of the formed phase was checked by means of X-ray diffractometry.

In this manner, a light output of initially 37 lm/W was achieved. After 1000 operating hours, the light output was approximately 34 lm/W. The quantum efficiency for VUV light is approximately 70%.

EXAMPLE 4

A cylindrical discharge vessel of glass having a length of 590 mm, a diameter of 24 mm and a wall thickness of 0.8 mm is filled with xenon at a pressure of 200 hPa. The discharge vessel contains an axis-parallel inner electrode in the form of a noble metal rod of 2.2 mm diameter. On the outside of the discharge vessel is the outer electrode that is composed of two strips of conductive silver 2 mm in width arranged axis-parallel and conductively connected to the power supply. The lamp is operated by means of a pulsed DC voltage.

The inner wall of the discharge vessel is coated with a phosphor layer.

The phosphor layer contains a three-band phosphor mixture with the following components: $BaMgAl_{10}O_{17}:Eu^{2+}$ as the blue component, $LaPO_4:Ce,Tb$ as the green component and $KMgF_3:Eu,Pb$ as the red component.

To produce $KMgF_3:Eu,Pb$ with 1.0 mol % europium and 1.0 mol lead, a quantity of 30.00 g $MgF_2$, 1.00 g $EuF_3$, 30.87 g KF and 1.18 g $PbF_2$ are thoroughly mixed and ground in an agate mortar. The mixture is preburnt in a corundum crucible in a quartz tube under an argon atmosphere at a pressure of 8 hPa for 2 hours at 300° C. During burning, the quartz tube was rinsed with argon 3 times and evacuated again to 8 hPa. The oven temperature was then increased at a rate of 5.5° C./min to 650° C. and the mixture sintered for 8 hours at 650° C. The sintered powder was reground and sieved to a grain size <40 µm. The crystal structure of the formed phase was checked by means of X-ray diffractometry.

In this manner, a light output of initially 37 lm/W was achieved. After 1000 operating hours, the light output was approximately 34 lm/W. The quantum efficiency for VUV light is approximately 70%.

EXAMPLE 5

A cylindrical discharge vessel of glass having a length of 590 mm, a diameter of 24 mm and a wall thickness of 0.8 mm is filled with xenon at a pressure of 200 hPa. The discharge vessel contains an axis-parallel inner electrode in the form of a noble metal rod of 2.2 mm diameter. On the outside of the discharge vessel is the outer electrode that is composed of two strips of conductive silver 2 mm in width arranged axis-parallel and conductively connected to the power supply. The lamp is operated by means of a pulsed DC voltage.

The inner wall of the discharge vessel is coated with a phosphor layer.

The phosphor layer contains a three-band phosphor mixture with the following components: $BaMgAl_{10}O_{17}:Eu^{2+}$ as the blue component, $LaPO_4:Ce,Tb$ as the green component and $RbGd_2F_7:Eu,Tl$ as the red component.

To produce $RbGd_2F_7:Eu,Tl$ with 1.0 mol % europium and 2.0 mol thallium, a quantity of 29.70 g $GdF_3$, 0.29 g $EuF_3$, 8.02 g RbF and 0.31 g TlF are thoroughly mixed and ground in an agate mortar. The mixture is preburnt in a corundum crucible in a quartz tube under an argon atmosphere at a pressure of 8 hPa for 2 hours at 300° C. During burning, the quartz tube was rinsed with argon 3 times and evacuated again to 8 hPa. The oven temperature was then increased at a rate of 5.5° C./min to 650° C. and the mixture sintered for 8 hours at 650° C. The sintered powder was reground and sieved to a grain size <40 μm. The crystal structure of the formed phase was checked by means of X-ray diffractometry.

In this manner, a light output of initially 37 lm/W was achieved. After 1000 operating hours, the light output was approximately 34 lm/W. The quantum efficiency for VUV light is approximately 70%.

The invention claimed is:

1. A gas discharge lamp fitted with a gas discharge vessel filled with a gas filling suitable for a gas discharge emitting VUV radiation, with a phosphor coating containing a downconversion phosphor, and with means for igniting and maintaining a gas discharge, in which the downconversion phosphor contains, in a host lattice, a pair of activators of a first lanthanoid ion and a second lanthanoid ion and a sensitizer selected from the group formed by $Tl^{1+}$, $PB^{2+}$, $Bi^{3+}$ and $Sm^{2+}$ co-activator.

2. The gas discharge lamp as claimed in claim 1, wherein the first lanthanoid ion is $Gd^{3+}$ and the second lanthanoid ion is selected from the $Ho^{3+}$ and $Eu^{3+}$.

3. The gas discharge lamp as claimed in claim 1, wherein the downconversion phosphor comprises $Gd^{3+}$ as the first lanthanoid ion and, as the second lanthanoid ion, $Ho^{2+}$ or $Eu^{3+}$ and the co-activator is further selected from the group formed by $Tb^{3+}$, $Yb^{3+}$, $Dy^{3+}$, $Eu^{3+}$, and $MN^{2+}$.

4. The gas discharge lamp as claimed in claim 1, wherein the host lattice of the downconversion phosphor is a fluoride.

5. The gas discharge lamp as claimed in claim 1, wherein the downconversion phosphor contains the first lanthanoid ion in a concentration of 10.0 to 99.98 mol %, the second lanthanoid ion in a concentration of 0.01 to 30.0 mol % and the sensitizer in a concentration of 0.01 to 30.0 mol %.

6. The gas discharge lamp as claimed in claim 1, wherein the downconversion phosphor contains the sensitizer in a concentration of 0.5 mol %.

7. The gas discharge lamp as claimed in claim 1, wherein the downconversion phosphor contains the co-activator in a concentration of 0.01 to 30.0 mol %.

8. The gas discharge lamp as claimed in claim 1, wherein the downconversion phosphor contains the co-activator in a concentration of 0.5 mol %.

9. A downconversion phosphor which contains, in a host lattice, a pair of activators of a first lanthanoid ion and a second lanthanoid ion, a sensitizer selected from the group formed by $Tl^{1+}$, $Pb^{2+}$ and $Bi^{3+}$, and $Sm^{2+}$ co-activator.

* * * * *